US007249689B2

(12) United States Patent
Hakala

(10) Patent No.: US 7,249,689 B2
(45) Date of Patent: Jul. 31, 2007

(54) CLIP FASTENER

(76) Inventor: John E Hakala, 57 Golden Glen Dr., Simi Valley, CA (US) 93065

( * ) Notice: Subject to any disclaimer, the term of this patent is extended or adjusted under 35 U.S.C. 154(b) by 0 days.

(21) Appl. No.: 10/512,023

(22) PCT Filed: Dec. 16, 2003

(86) PCT No.: PCT/US03/39958

§ 371 (c)(1),
(2), (4) Date: Oct. 19, 2004

(87) PCT Pub. No.: WO2005/026027

PCT Pub. Date: Mar. 24, 2005

(65) Prior Publication Data

US 2005/0230412 A1 Oct. 20, 2005

Related U.S. Application Data

(60) Provisional application No. 60/497,647, filed on Aug. 25, 2003.

(51) Int. Cl.
*B65H 31/20* (2006.01)
*B23Q 7/10* (2006.01)

(52) U.S. Cl. ...................... 221/242; 221/155; 221/191; 29/814

(58) Field of Classification Search .................. 29/814, 29/809
See application file for complete search history.

(56) References Cited

U.S. PATENT DOCUMENTS

2001/0013521 A1 * 8/2001 Hakala ...................... 221/276

* cited by examiner

*Primary Examiner*—Gene O. Crawford
*Assistant Examiner*—Timothy Waggoner
(74) *Attorney, Agent, or Firm*—Colin P. Abrahams

(57) ABSTRACT

A clip fastener (10) comprises a housing and a releasable cartridge (12) to hold a plurality of clips (20). There is a truck (14) having a pair of guide rails (50, 52) to receive the clips (20). There is a mechanism (76, 78) to vary the distance between the guide rails (50, 52). There is a ram (68) to )move a clip (20) along the track (14). There is a depressor (90) to slightly open the loops.

30 Claims, 8 Drawing Sheets

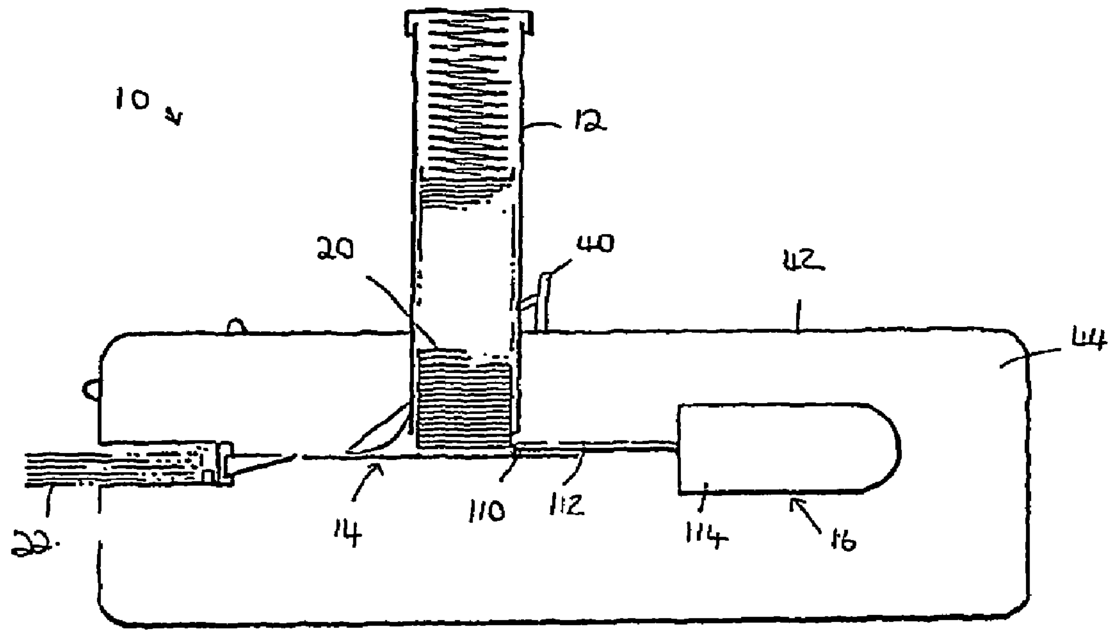
FIG. 1
FIG. 2
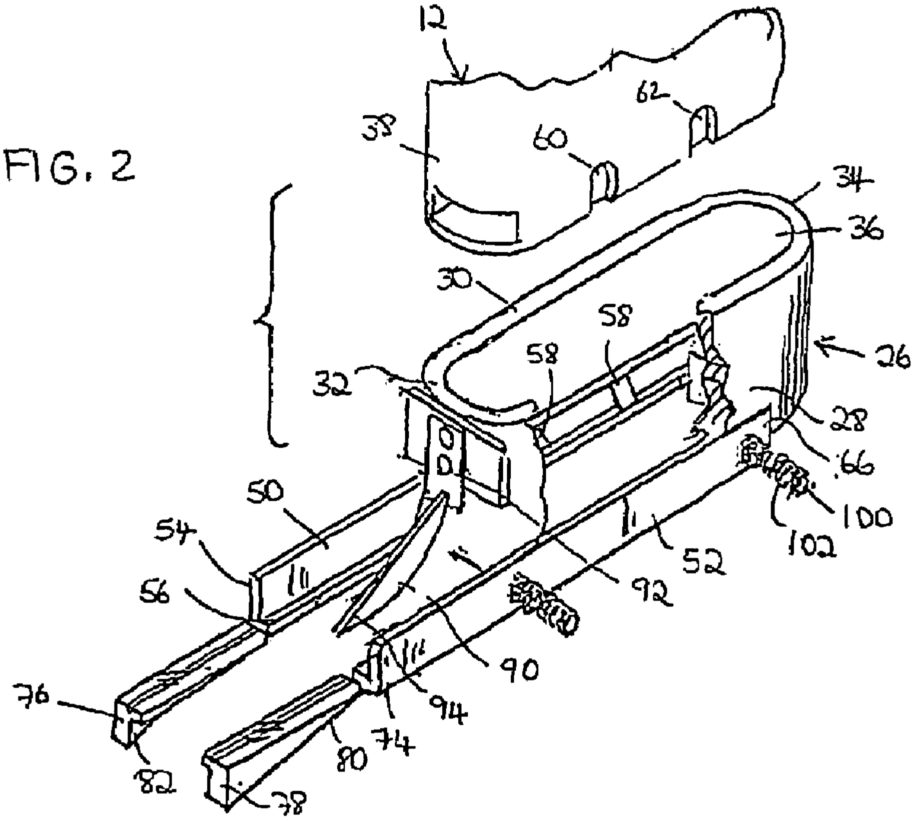

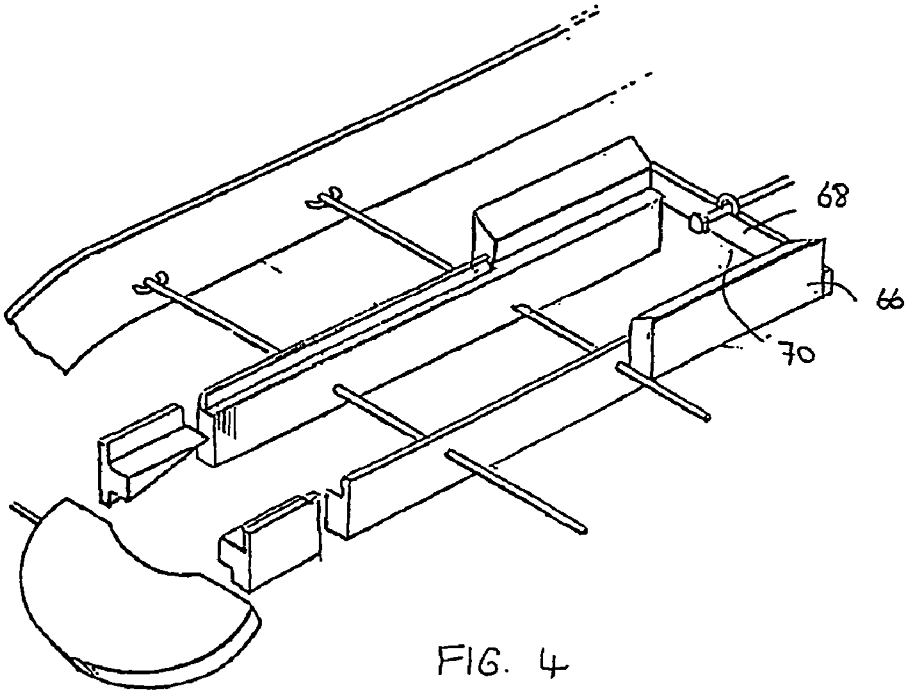
FIG. 4
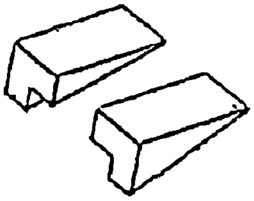
FIG. 11
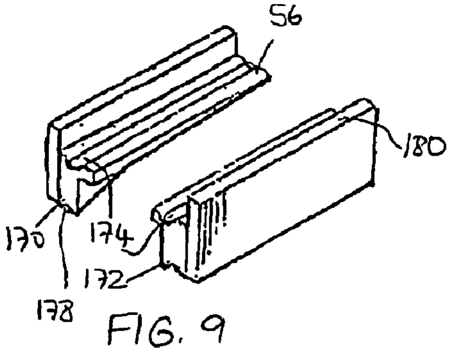
FIG. 9
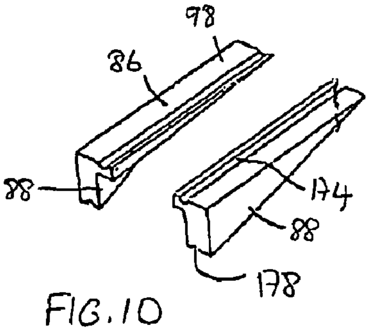
FIG. 10
FIG. 12

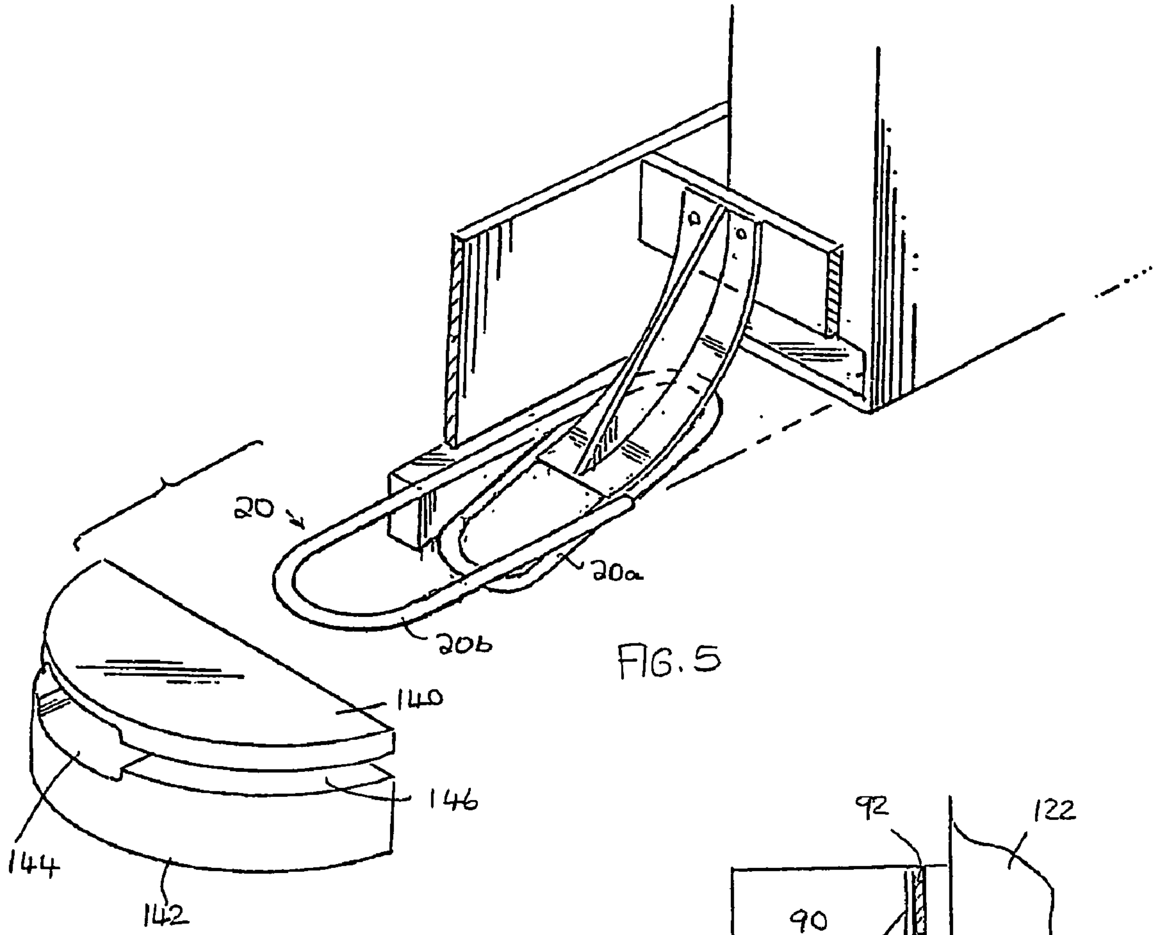
FIG. 5
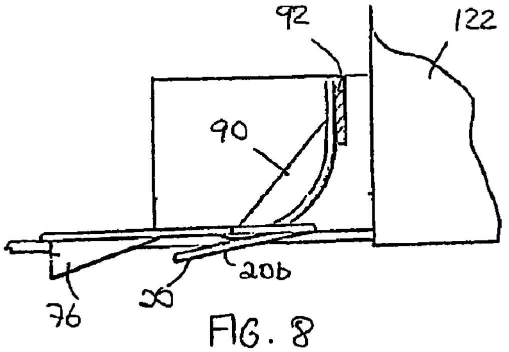
FIG. 8
FIG. 7
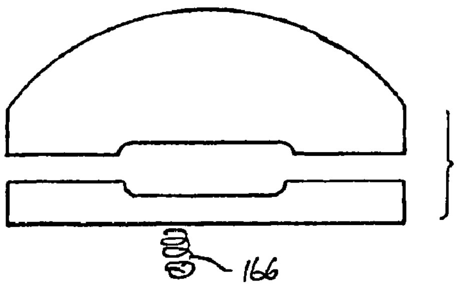

FIG. 14
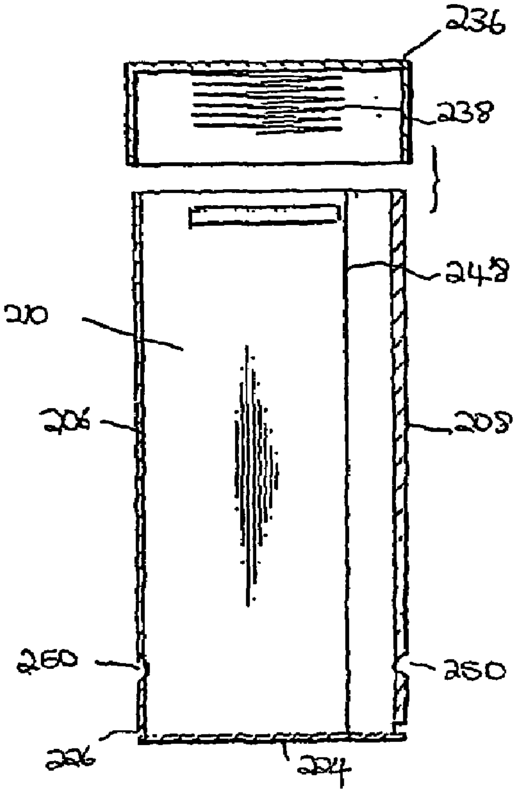
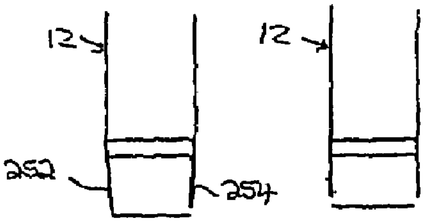
FIG. 15 FIG. 16
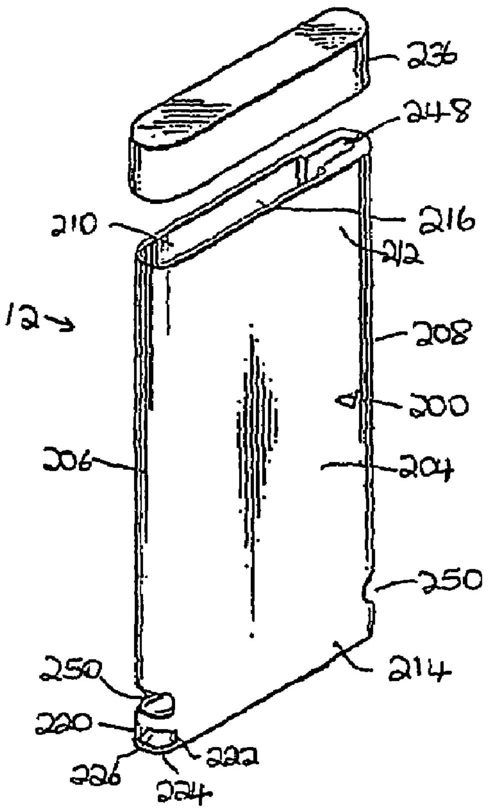
FIG. 13

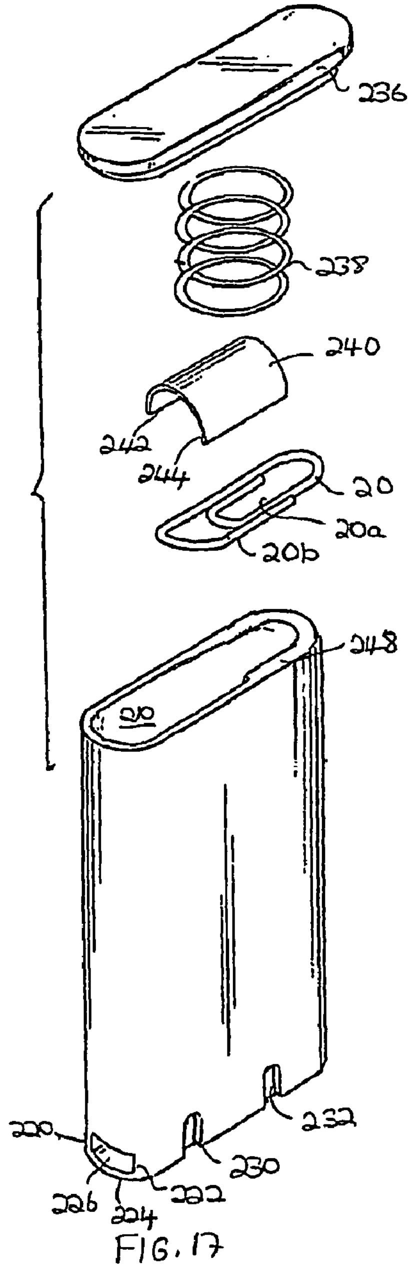
FIG. 17
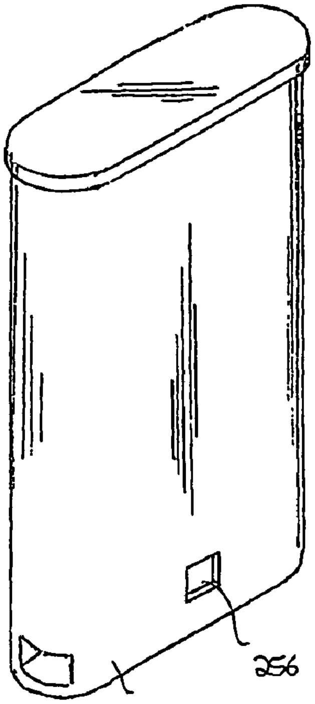
FIG. 21
FIG. 18
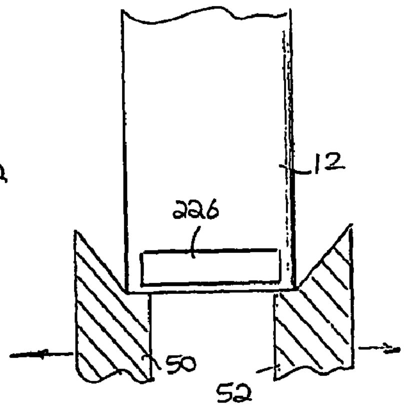
FIG. 19
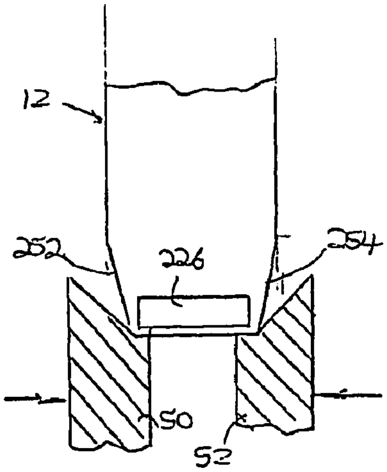

CLIP FASTENER

FIELD AND BACKGROUND OF THE INVENTION

This invention relates to clip fasteners. Particularly, the invention is one for a paper clip fastener, which can store a plurality of clips in a storage area or magazine, and automatically locate a clip about a stack of papers or other materials upon actuation, whether manual, electrical or otherwise, of the fastener.

As is well known, the paper clip has become an indispensable accessory, used in offices as well as homes. The paper clip essentially comprises a length of narrow steel wire bent in a curve upon itself at approximately 180° at three points along its length. The paper clip has an outer loop and an inner loop. Since the paper clip is comprised of spring steel, the outer loop and inner loop can be moved in opposite directions to create a space therebetween in which a stack of papers or other materials can be received. A slight but sufficient force inherent in the steel tends to close the inner and outer loops and keep the papers securely in position.

For the most part, paper clips are applied manually by a person to a stack of papers. This involves neatly arranging the stack of papers so that they fully overlap each other, removing a paper clip from a box or other container, manually spreading the inner and outer loops of the paper clip from each other and thereafter applying it to the stack of papers. This is a fairly slow and cumbersome process, especially when large mailings take place, and it is necessary to repeat this process a substantial number of times.

Another factor which tends to cause inconvenience and delay in applying paper clips is that they are usually arranged randomly in the box or container and, during the packing and transport procedures, often become entangled or connected with each other. Therefore, removal of a paper clip from a container may often result in having to separate it from one or more other paper clips.

Although various paper clip applicators which comprise machines or devices for automatically placing paper clips onto a stack of paper have been proposed and form part of the patent literature, these are often complex machines which are not user-friendly, or are large and difficult to use in practice.

SUMMARY OF THE INVENTION

According to one aspect of the invention, there is provided a clip fastener comprising: a housing; a releasable cartridge or magazine located in or on the housing for holding a plurality of clips, the releasable cartridge having regulating means thereon; a track for receiving clips from the magazine, the track comprising a pair of guide rails; means for varying the distance between the guide rails in response to the regulating means on the cartridge; and a ram member for moving the clip along a pathway defined by the track.

The clip fastener may further comprise spreader means for separating an inner loop of the clip from an outer loop thereof. Further, the cartridge may be permanently mounted or fixed on the clip fastener.

Preferably, the means for varying the distance between the guide rails comprises at least one projection associated with each of the guide rails, and the regulating means on the cartridge comprises an activating surface on the cartridge, the activating surface cooperating with the means for varying the distance on the guide rails to set the distance between the guide rails. The activating surface may comprise the presence or absence of a recess, wherein the recess when present receives the projection so the distance between the guide rails remains unchanged, and the absence of a recess causes the activating surface to engage the projection to force the guide rails further apart from each other.

In another embodiment, the means for varying the distance between the guide rails comprises a receiving surface associated with each of the guide rails; and the regulating means on the cartridge comprises an activating surface on the cartridge, the activating surface cooperating with the receiving surface on the guide rails to set the distance between the guide rails.

Preferably, a sensor switch is associated with the cartridge, and a window in the cartridge through which the sensor switch can detect the presence or absence, or near absence of clips in the cartridge.

Preferably, the guide rails are movable between a first position so as to have a first distance between them and a second position so as to have a second, larger distance between them, the guide rails in the first position being adapted to receive standard size smaller clips and the guide rails in the second position being adapted to receive standard larger clips.

In the preferred embodiment, the ram member comprises an abutment member, or head, for engaging the lowermost clip in the cartridge and pushing it along the pathway. The ram member may be mechanically or electrically activated.

According to another aspect of the invention, there is provided a cartridge for use on a clip fastener, the cartridge comprising a housing for receiving a plurality of paper clips, regulating means on the housing for cooperating with the clip fastener, the regulating means adjusting the distance between a pair of guide rails in the housing so the guide rails will be configured to process paper clips of the size contained in the cartridge. The cartridge may further comprise a window through which a sensor switch can detect the presence or absence or near absence of clips in the cartridge through direct contact with the clips or by sensing the position of a clip pusher inside the cartridge.

BRIEF DESCRIPTION OF THE DRAWINGS

FIG. 1 shows a schematic cross-section through one embodiment of a clip fastener of the invention including a sheaf of papers to be attached by a paper clip;

FIG. 2 is a perspective view of some of the internal components of a clip fastener in accordance with the invention, shown in another embodiment thereof with certain components and features as shown in FIG. 1 of the drawings;

FIG. 4 shows a perspective view of the rails of the clip fastener of the invention as shown in FIG. 1 of the drawings;

FIG. 5 is a perspective view of a paper clip in the clip fastener of the invention after the inner loop has been separated from the outer loop by a depressing means and as it has begun to move across the spreaders;

FIG. 7 shows a schematic front view of the mouth of the clip fastener of the invention as shown in FIG. 1 of the drawings;

FIG. 8 is a side view of a depressing member as it separates the inner and outer loops of a clip;

FIGS. 9 and 10 are perspective views of two particular embodiments of pairs of spreaders used on a clip fastener of the invention;

FIG. 11 is a perspective view of another particular embodiment of a pair of spreaders used on a clip fastener of the invention;

FIG. 12 is a perspective view of the depressing member as shown in FIG. 5;

FIG. 13 is a perspective view of a magazine of the clip fastener of the invention;

FIG. 14 is a side view of the magazine shown in FIG. 13 of the drawings, FIGS. 15 and 16 are partial front views of the lower ends of magazines for small and large clips respectively;

FIG. 17 is an exploded view of the internal components of a magazine of a clip fastener in accordance with the present invention shown in one embodiment thereof;

FIGS. 18 and 19 show the effect of the magazines as they act upon the regulating surfaces of the guide rails in one embodiment of the invention;

FIG. 21 shows an opening for a sensor switch in a magazine; and

DETAILED DESCRIPTION OF THE INVENTION

Reference is now made to the various drawings and illustrations accompanying the specification, for describing different embodiments and modifications of the clip fastener, magazine and other components and features of the present invention.

Figure 3:
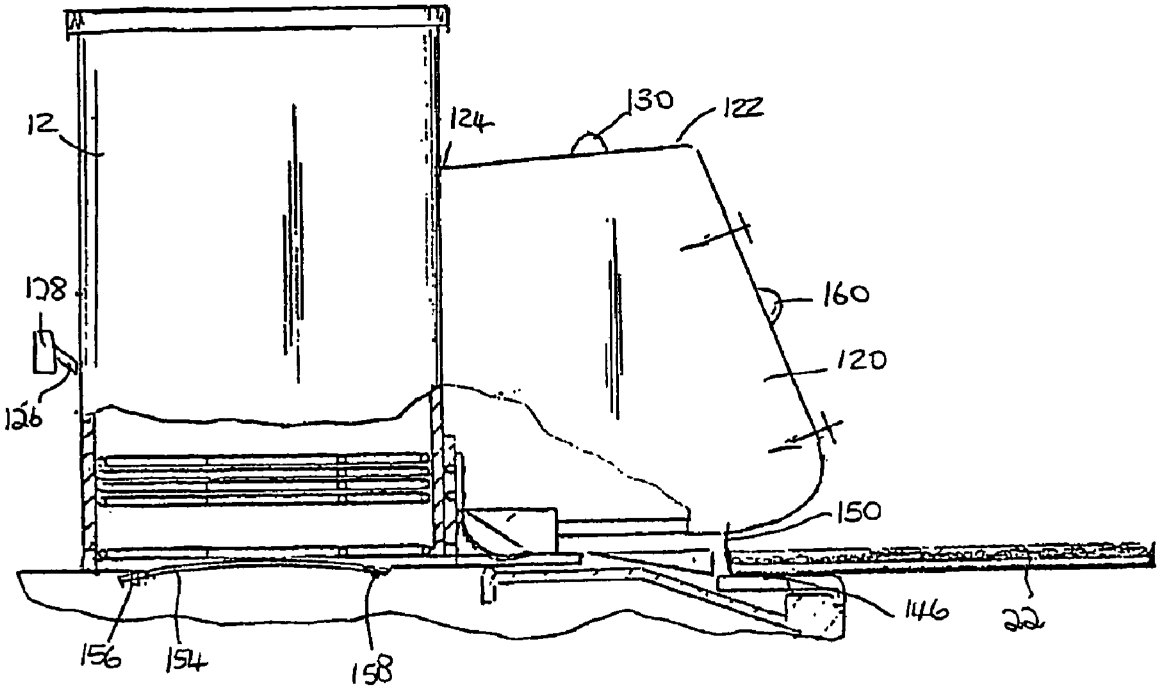
FIG. 3 is a cross-section through parts of the invention similar to that shown in FIG. 1 of the drawings, but with a cut out revealing some additional components and certain modifications made thereto.

Reference is now made to FIGS. 1-3 of the drawings, which show some of the major components for the function and operation of the clip fastener in accordance with the present invention. In FIG. 1, there is shown a clip fastener 10, generally comprising a magazine 12, which will be described in greater detail below, a track system 14 with associated depressor means and spreaders, and a paper clip advance mechanism 16. These are the three core systems by means of which a paper clip 20 (see for example FIG. 17) is dispensed from the magazine 12, and moved along the track system 14 by the clip advance mechanism 16 so as to properly prepare the paper clip 20 for attachment to a sheaf of papers 22. The paper clip 20 will have an inner loop 20*a* and an outer loop 20*b*.

The track system 14 comprises a magazine receiver 26, comprising a pair of side walls 28 and 30, a front wall 32, and a rear wall 34. The various walls 28, 30, 32 and 34 define an opening 36 which is substantially identical in shape to the magazine 12, so that the lower end 38 of the magazine 12 is received within the opening 36. The magazine 12 is releasably secured in the position in the opening 36, using an attachment mechanism which will be discussed below with reference to the various figures. The respective shapes of the magazine 12 and the magazine receiver 26 ensure that the magazine 12 cannot be loaded in the incorrect orientation. A sensor switch 40 (shown schematically), may be mounted on upper surface 42 of a housing 44 and clip fastener 10. The wall of the magazine 12 has an opening through which an arm of the switch extends and senses the presence or absence or near absence of paper clips 20 as will be described.

The track system 14 comprises a pair of guide rails 50 and 52, and the magazine receiver 26 is mounted over, or upon, these guide rails 50 and 52. Each guide rail 50 and 52 comprises a substantially vertical wall 54 and a horizontal wall 56, and the paper clip 20, upon exiting the magazine 12, slides over the horizontal walls 56 of each of the guide rails 50 and 52, and between the vertical walls 54 thereof.

In the embodiment shown in FIG. 2, each guide rail 50 and 52 has two or more inclined wedges 58 extending between the vertical wall 54 and horizontal wall 56 at the point where the guide rails 50 and 52 are positioned under the magazine receiver 26. These wedges 58 correspond substantially to the recesses 60 and 62 in the magazine 12 and register with them when the magazine 12 is inserted in the magazine receiver 26. It should at this point be noted that magazines 12 containing smaller-size paper clips 20 will contain the recesses 60 and 62, and the wedges 58 will be received therein. However, magazines 12 intended to accommodate jumbo or larger-size paper clips will not have the recesses 60 and 62. As such, and upon insertion of the magazine 12 into the magazine receiver 26, the lower end 38 of the magazine 12 will slide against the wedges 58, and the effect thereof will be to push the guide rails 50 and 52 slightly more apart from each other. This larger space between the guide rails 50 and 52, which will be described in further detail below, allows larger or jumbo-size paper clips to be accommodated for processing on the guide rails 50 and 52.

The front wall 32 of the magazine receiver 26, in the embodiment shown in FIG. 2 is located above the upper surface of the vertical wall 54 of each of the guide rails 50 and 52. The guide rails 50 and 52 continue under the magazine receiver 26, and each guide rail 50 and 52 has a rear end 66, which abuts against ram support 68 (FIG. 4). A passage or opening 70 is formed within the ram support 68, which enables the clip advance mechanism 16 to slide thereunder and move a paper clip 20, as will be described.

Each of the guide rails 50 and 52 has a forward end 74. One each of a pair of spreaders 76 and 78 are located directly adjacent the forward ends 74. Each spreader 76 and 78 is wedge-shaped, and has a sharp edge 80 adjacent the forward end 74, tapering from a wide end 82. Further, as seen in FIGS. 9 to 11, each spreader 76 and 78 has a moderately inclined horizontal wall 86 and a more extensively inclined vertical wall 88 to facilitate the spreading or parting of the inner loop of the paper clip 20 from the outer loop thereof.

A resilient depressor member 90 is secured to the front wall 32 of the magazine receiver 26 by means of a connector 92. The depressor member 90 terminates at an end 94, and is generally curved. The end 94 has the effect of pushing down the inner loop of the paper clip 20, but not the outer loop thereof, best seen in FIG. 5. The depressor member 90, and particularly the end 94 thereof is strategically positioned such that the inner loop of a paper clip will be pushed downwardly immediately prior to reaching the sharp end 80 of each of the spreaders 76 and 78. Therefore, as the paper clip 20 advances onto the spreaders 76 and 78, the inner loop and outer loop of the paper clip 20 will be separated, with the outer loop advancing along the upper surface 98 of the horizontal wall 86 (FIG. 10), and the inner loop advancing under either the horizontal wall 86 or vertical wall 88. As the paper clip 20 advances, the spreaders 76 and 78 will have the effect of parting the inner loop from the outer loop to an even greater degree, as the paper clip 20 reaches the wide end 82. Depending upon whether the inner loop of the paper clip 20 is below the horizontal wall 86 or the vertical wall 88, the degree of parting of the inner loop from the outer loop will vary. Typically, but not necessarily, the inner loop of a standard size paper clip could pass below the inclined horizontal wall 86 so that a smaller separation will take place, while the inner loop of a jumbo clip could pass below the inclined vertical wall 88 so that a larger parting will take place, based on the assumption that a larger paper clip will normally be used for holding together a larger number of papers. In fact, the spreaders 76 and 78, which do not move relative to each other, are constructed so as to achieve this objective in the embodiment shown in FIG. 2. When the guide rails 50 and 52 are closer together for a small paper clip, the smaller paper clip 20 will be parted by the horizontal wall 86. When the guide rails 50 and 52 are further apart, for a larger paper clip 20, the larger paper clip 20 will be parted by the vertical wall 88.

With reference to the guide rails 50 and 52, these are movable between at least two positions. A first position is shown in FIG. 2 of the drawings. This position shows the guide rails 50 and 52 closer to each other. The guide rails 50 and 52 are mounted on axles or rods 100, and can move apart over these rods 100. A spring 102 is located on each axle 100 so as to urge, in the normal course, the guide rails 50 and 52 towards each other. In the positions shown in FIG. 2 of the drawings, the horizontal walls 56 of the guide rails 50 and 52 correspond to the horizontal wall 86 of the spreaders 76 and 78, so that an inner loop of a paper clip would, during the dispensing process, be in the position below the horizontal wall 86.

Where jumbo or larger size paper clips 20 are used, a magazine 12 without recesses 60 and 62 would be inserted into the magazine receiver 26, and the lower end 38 of the magazine 12 would engage the wedges 58 and push the guide rails 50 and 52 apart from each other by a given distance, acting against the biasing force of the spring 102. The amount by which the distance between the guide rails 50 and 52 is increased would be sufficient so that the guide rails 50 and 52 could accommodate a larger or jumbo size paper clip 20. In this position, the horizontal wall 56 of each of the guide rails 50 and 52 would be positioned so as to pass the inner loop of the paper clip below the vertical wall 88 of each of the spreaders 76 and 78 so as to part the inner and outer loops by a greater distance than would be the case with a small paper clip 20.

The clip advance mechanism 16 generally comprises a ram 110 and ram rod 112 connected to a motor 114, Upon inserting papers 22 into the opening (FIG. 1) and striking the switch 150 (FIG. 3), the ram rod 112 advances and the ram 110 engages the lowermost clip 20 in the magazine 12 and pushes the clip along the pathway defined by guide rails 50 and 52. The ram 110 will be able to travel between a position wherein the front end thereof advances, or moves to the left as shown in FIG. 1, and retreats, or moves to the right as shown in FIG. 1, by a distance which, as will be described, is sufficient to move a paper clip 20 from the magazine 12, along the guide rails 50 and 52, over the spreaders 76 and 78, to engage a sheaf of papers 22.

Reference is now made to FIG. 3 of the drawings, which indicates some additional features of the invention. The paper clip fastener of the invention includes, as shown in FIG. 3, a housing 120 including an upper portion 122 which has a slot or opening 124 for receiving the magazine 12. The magazine 12 is thus inserted by pushing through the opening 124 in the housing 120, and then down into the magazine receiver 26. In another embodiment, the magazine 12 may be permanently mounted in the housing 120.

It will also be seen in FIG. 3 of the drawings that an arm 126 of a sensor switch 128 is able to sense the presence or absence or near absence of paper clips 20 within the magazine 12.

The motor 114 engages the ram 110 and, as seen in FIG. 1 of the drawings, the ram 110 is in the starting position. An indicator light 130 is mounted in the upper portion 122 of the housing 120. The indicator light 130 is in electrical contact with the sensor switch 128. When the arm 126 detects the absence or near absence of paper clips 20 in the magazine 12, the sensor switch 128 will cause the indicator light 130 to illuminate, as a signal or warning to users that loading of paper clips 20 is required. When there are no paper clips 20 in the magazine 12, the sensor switch 128 may also have the effect of preventing the activation of the motor 114, which will then not operate unless paper clips 20 have been loaded. The switch 128 may also be located so as to signal a predetermined small supply of clips 32 in the magazine 12.

With reference to FIGS. 5 and 7, showing a perspective and front end view of the path and passage for paper clips 20 from the spreaders 76 and 78 on to papers 22, the housing 120 can be seen to include a forward cover 140, a front end 142, and a slot 144 therebetween, the slot 144 for receiving the inserted papers 22 to be held together by a paper clip 20. The papers 22 rest on a working surface 146, appropriately located near the wide end 82 of the spreaders 76 and 78, so the paper clip 20 is dispensed directly to engage the papers 22. An activator switch 150 (see FIG. 3) is located relative to the working surface 146 and the dispensing operation is initiated when the papers 22 touch the activator switch 150

FIG. 3 also shows the presence of leaf spring 154 formed in the area below the magazine 12. In this embodiment, there would be no horizontal wall 56 where the leaf springs 154 are located. Each leaf spring 154 is secured in position by a pair of pins 156 and 158. When the magazine 12 is inserted into the magazine receiver 26, it will rest upon, and slightly compress, the leaf spring 154. When upward pressure of sufficient force is used to free the magazine from, for example, the ball bearing attachment mechanism (not shown), the leaf spring 154 will have the effect of slightly "popping up" the magazine 12 for easy removal. Further, the leaf spring 154, by its upward bias, will have the effect of more securely fastening and holding the magazine 12 within the housing 120 and reduce or effectively eliminate any "rattling" or movement of the magazine 12 therein.

The horizontal wall 56 may be absent in the area below the magazine 12 which allows the bottom of the wall of the magazine 12 to rest on the leaf spring 154 and compress it.

Figure 6:
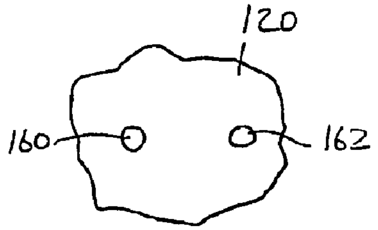
FIG. 6 is a partial cut away view of the clip fastener of the invention showing clip size indicator lights as shown in FIG. 2 of the drawings.

The housing 120 includes a pair of lights 160 and 162, best shown in FIG. 6. The light 160, for example, will provide a signal that the paper clip fastener of the invention has been loaded with paper clips 20 of the smaller size, while the light 162 will illuminate when a magazine 12 has larger or jumbo-size paper clips loaded into the housing 120. Although not specifically shown in the drawings, the lights 160 and 162 may be respectively actuated by the parting and moving together of the guide rails 50 and 52, which will of course be determined by the configuration of the magazine 12 which has been loaded into the paper clip dispenser or they may be actuated by means associated with the respective magazines.

Another modification shown in the embodiment of FIG. 7 of the drawings relates to the presence of a spring 166 formed below the working surface 146. This spring 166 normally holds the working surface 146 in an upper position, but is compressed so as to drop slightly the working surface 146 when a large number of papers 22 are located on the working surface 146. This may occur when the larger or jumbo-size clips are used. The spring 166 will therefore allow the working surface 146 to drop in response to the weight or volume of the papers 22 and thereby more accurately locate the papers 22 to be in an optimal position when the paper clip 20 advances from the mechanism to engage these papers.

FIG. 10 shows another embodiment of spreaders 76 and 78 shown in FIG. 2. The spreaders 170 and 172 illustrated in FIG. 10 of the drawings are characterized by the presence of small grooves or channels 174 on the upper surface of the horizontal wall 56. These channels 174 help stabilize the position of the paper clips 20 as they move across the flat surfaces and sloped bottoms of the spreaders 170 and 172.

The spreaders 170 and 172 also include channels or grooves 178 on the lower surface thereof, also present for engaging the inner loop to stabilize the movement of the paper clip 20 over the spreaders 170 and 172, before engagement with the papers 22.

FIG. 9 shows a slight variation of the spreaders shown in FIG. 10. In FIG. 9, one or both of the spreaders 170 and 172 also have the grooves 174 and 178, but additionally incorporate a side wall 180 shown in spreaders 170 and 172. The side wall 180 serves to further guide and restrict the lateral movement of a paper clip 20 moving over the spreaders 170 and 172, enhancing the accuracy and efficiency of the system.

In FIGS. 13 to 19 of the drawings, there is shown a magazine 12 for use in one or more embodiments of the clip fastener in accordance with the present invention. The magazine 12 comprises an elongate housing 200 having side walls 202 and 204, a front wall 206, and a rear wall 208. The housing 200 includes an accessible chamber 210 for paper clips.

The housing 200 has an upper end 212, and a lower end 214. The chamber 210 extends from the upper end 212 to the lower end 214, and is configured in the shape and/or form of a paper clip 20. The upper end 212 has an opening 216 through which the paper clips 20 may be inserted. A plurality of paper clips 20 sits within the chamber 210 of the magazine 12, with the lowermost paper clip 20 being located near the lower end 214. The lower end 214 is of U-shape construction, and is comprised of side walls 220 and 222, and bottom plate 224, which together define a passage 226. As will be described, the clip fastener of the invention includes a movable ram or equivalent structure, at least a part of which passes through the passage 226, and which is configured so as to push out the lowermost paper clip 20. This lowermost paper clip 20 slides along the bottom plate 224 until it exits from the front 206 of the magazine 12.

Figure 20:
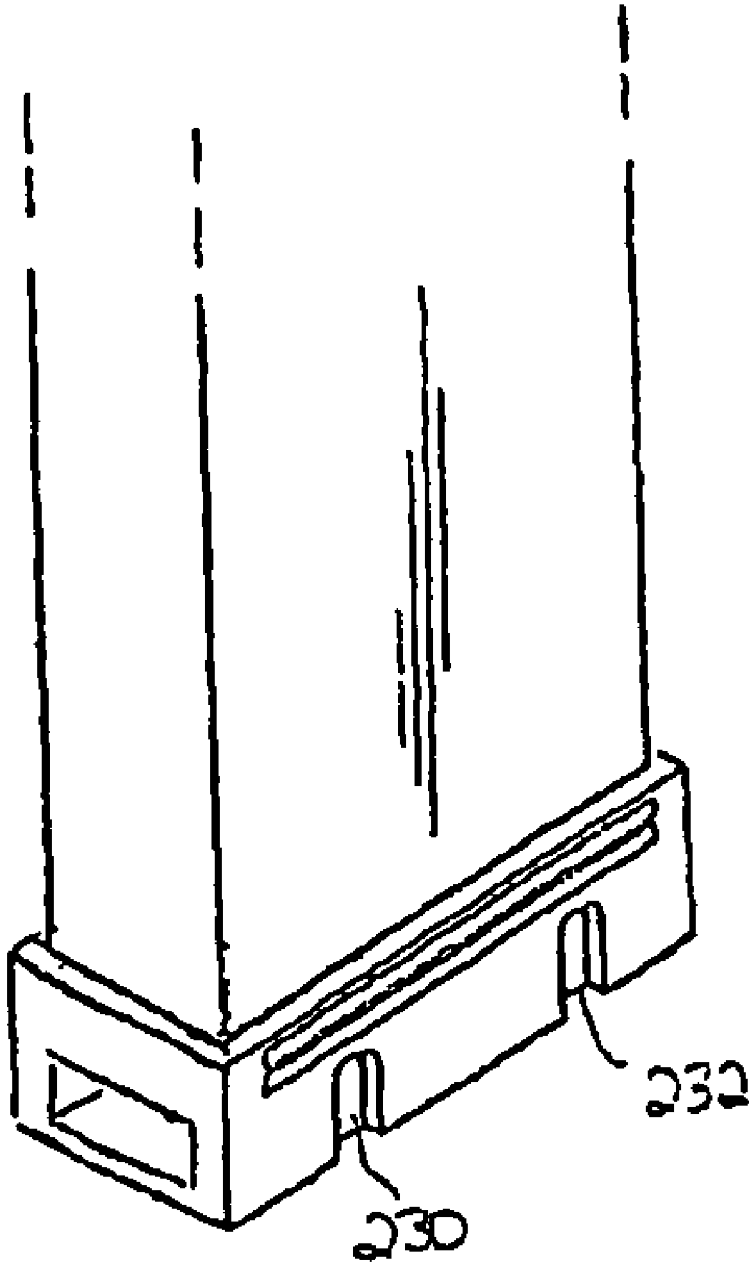
FIG. 20 is a view of another embodiment of a magazine as used in the present invention.

In one form of the magazine 12, on each of the exterior side walls 202 and 208, near the lower end 214 of the magazine 12, there is formed a pair of recesses 230 and 232 (shown in FIGS. 17 and 20). Note that these recesses 230 and 232 will not appear in all magazines 12. The recesses 230 and 232 will typically be formed on magazines 12 which are designed to hold small or standard-size paper clips 20. Magazines 12 which are designed to hold larger or jumbo-size paper clips 20 will not have the recesses 230 and 232. As will be described in further detail below, the absence of these recesses has the effect of widening the space between the guide rails 50 and 52 on the paper clip fastener when such a magazine 12 is inserted in the fastener.

The opening 216 of the magazine 12 is closed off with a cap assembly, comprising a cap 236, a spring 238, and a pusher 240. The pusher 240 has ends 242 and 244 which abut against the outer loop of the paper clip 20. The pusher 240 itself is pressed down by the spring 238, which engages against the cap 236. The cap 236 fastens onto the upper end 212 of the magazine 12, once the plurality of paper clips 20 has been inserted within the chamber 210. The chamber 210 is shaped so that the paper clips 20 can only be inserted in the properly oriented position, such as by a key 248.

In another embodiment, the magazine 12 may be permanently attached to the housing 120 and form an integral part thereof. The magazine 12 may also have recesses 250 into which spring-biased bearings may engage the recesses 250 to hold the magazine 12 in place inside the housing 120.

FIG. 14 shows a side view of the magazine 12 as illustrated in FIG. 13 of the drawings. FIG. 14 shows a magazine 12 without the recesses 230 and 232 and FIGS. 15, 16, 18 and 19 show regulating surfaces near the bottom of magazine 12. FIG. 15, unlike FIG. 16, shows slightly inwardly sloped side walls 252 and 254 which will have no effect upon the guide rails 50 and 52 when inserted into the housing 120. The magazine 12 shown in FIGS. 16 and 18 will widen the distance between guide rails 50 and 52. There is also a contact aperture 256, shown in FIG. 21, which forms a window. In use, the paper clip sensor switch 128 having an arm 126 is located adjacent the magazine 12. The arm 126 extends through the contact aperture 256, and is able to sense the presence of paper clips 20 within the chamber 210. As will be described in further detail below, the presence or absence of paper clips 20 within the chamber 210 is then communicated, through the sensor switch 128 and electric wires (not shown), to provide an indication to the user so that paper clips can be inserted in the chamber when needed. Further, the sensor switch 128 can deactivate the motor 114, to prevent actuation when no paper clips 20 are present.

FIG. 1 shows the magazine 12 with paper clips 20 mounted above the opening 36 of the clip fastener mechanism 10. The ram 110 is substantially in the resting position, and the motor is off, or not running. The paper clip engager of the ram 110 is positioned such that it is behind the lowermost paper clip 20 in the magazine 12.

Upon actuation of the motor 114, the ram 110 begins to move forward and the paper clip engager begins to push forward, toward spreaders 76 and 78, the lowermost paper clip 32 in the magazine 12. The paper clip engager passes through the passage in the magazine receiver 26, and into the passage 226 of the magazine 12.

When ram is approximately halfway along its travel cycle, it has moved the lowermost paper clip 20 partially out of the magazine 12, and the paper clip 20 is riding along the horizontal wall 56 of each of the guide rails 50 and 52, and between the vertical walls 54 thereof. The end 94 of the depressor means 90 engages the inner loop of the paper clip 20, as shown clearly in FIGS. 5 and 8. This prepares the paper clip for the spreaders 76 and 78, by parting the inner and outer loops of the paper clip 20 so as to form a space therebetween. When the ram 110 has almost reached the forward most position, and the advancing paper clip 20 is fully separated over the spreaders 76 and 78, and ready to engage over a sheaf of papers 22, the last forward movement of the ram 110 moves the paper clip 32 beyond the spreaders 76 and 78 so as to fully engage the papers 22.

When a paper clip 20 has been removed from magazine 12, the effect of the spring 238 will cause the plurality of paper clips in the magazine 12 to move downward, allowing the next paper clip 20 to move into the correct position once the ram has been fully returned to the start position.

Figure 22:
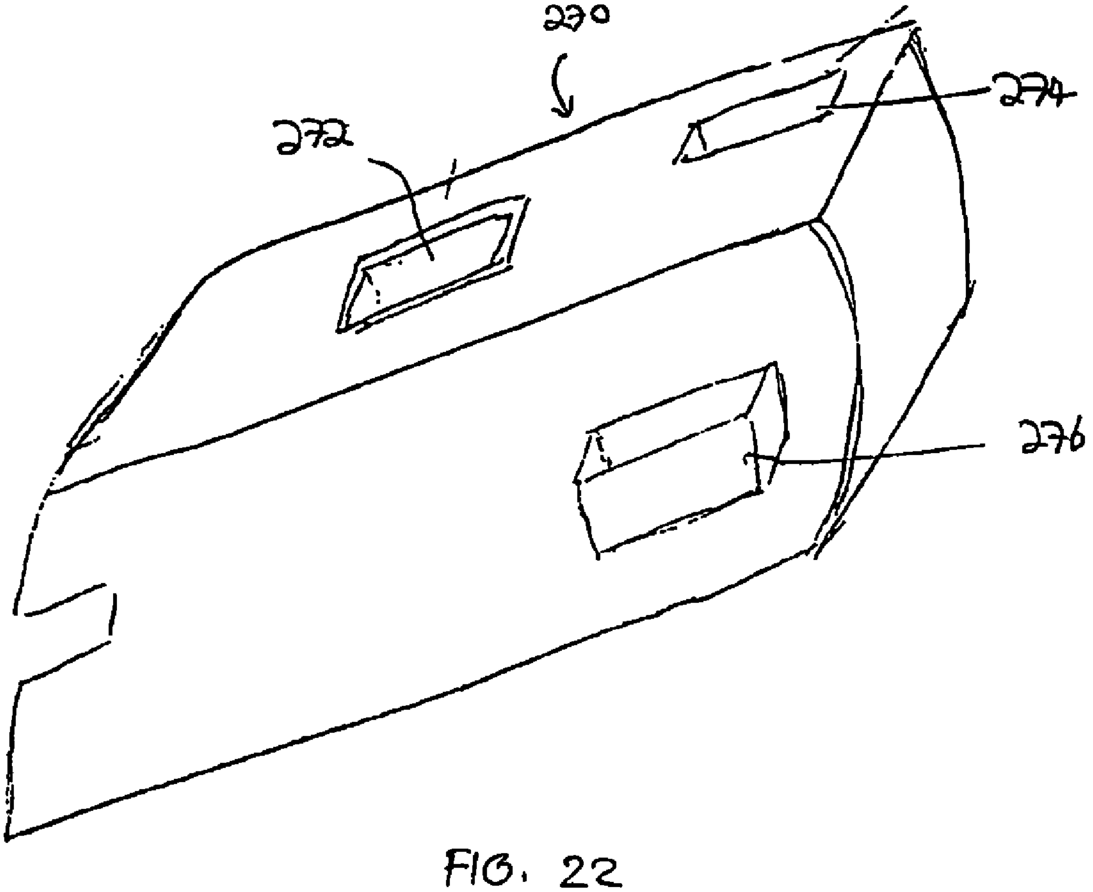
FIG. 22 shows an alternative housing including storage areas for magazines.

FIG. 22 is a perspective schematic view of a housing 270 including a recess or slot 272 for receiving an active magazine 12 for use with the paper clip dispenser of the invention. The housing 270 also has one or possibly two storage areas for magazines not in use. Storage areas in two positions or locations on the housing 270 are illustrated on the housing 270 shown in FIG. 22, although a typical housing will have only one of the two storage shown. The top storage area 274 and the side storage area 276 are both configured to receive a magazine 12. The stored magazine can be easily removed from the storage area and placed in the active slot 272. The magazine storage areas 274 and 276 can be used to carry spare magazines or magazines for paper clips of a different size.

The invention is not limited to the precise details which have been mentioned herein. It will be appreciated, for example, that any appropriate ram could be used for engaging and dispensing the paper clips. Further, the clip fastener may not be provided with spreaders where the clip fastener is configured so as to dispense a paper clip with a slight separation on, or bending of, the inner or outer loop. This will obviate the need to separate the inner and outer loops prior to moving the paper clip over the papers.

The invention claimed is:

1. A clip fastener comprising:

a housing;.

a releasable cartridge located in or on the housing for holding a plurality of clips, the releasable cartridge having regulating means thereon;

a track for receiving clips from the magazine, the track comprising a pair of guide rails;

means for varying the distance between the guide rails in response to the regulating means on the cartridge;

a ram member for moving the clip along a pathway defined by the track; and a soring member for engaging the cartridge to facilitate secure attachment within the clip fastener.

2. A clip fastener as claimed in claim 1 further comprising spreader means for separating an inner loop of the clip from an outer loop thereof.

3. A clip fastener as claimed in claim 1 wherein the releasable cartridge comprises a magazine having rectangular or oval body for receiving a plurality of stacked clips, the body having a lid and a spring for urging the plurality of clips in a direction away from the lid, the body further having a dispensing aperture at an end opposite that of the lid, wherein a clip within the caitridge is dispensed through the dispensing aperture.

4. A clip fastener as claimed in claim 1 wherein each guide rail receives a side piece of an outer loop of the clip, the distance between the rails slightly exceeding the width defined by side pieces of an inner loop of the clip.

5. A clip fastener as claimed in claim 1 wherein:

the means for varying the distance between the guide rails comprises at least one projection associated with each of the guide rails; and the regulating means on the cartridge comprises an activating surface on the cartridge, the activating surface cooperating with the means for varying the distance on the guide rails to set the distance between the guide rails.

6. A clip fastener as claimed in claim 5 wherein the activating surface comprises the presence or absence of a recess, wherein the recess when present receives the projection so the distance between the guide rails remains unchanged, and the absence of a recess causes the activating surface to engage the projection to force the guide rails further apart from each other.

7. A clip fastener as claimed in claim 1 wherein:

the means for varying the distance between the guide rails comprises a receiving surface associated with each of the guide rails; and the regulating means on the cartridge comprises an activating surface on the cartridge, the activating surface cooperating with the receiving surface on the guide rails to set the distance between the guide rails.

8. A clip fastener as claimed in claim 7 wherein the receiving surface is a substantially flat area and the activating surface comprises the presence or absence of a projection, wherein the absence of the projection causes the distance between the guide rails to remain unchanged, and the presence of a projection causes the projection to engage the flat area to force the guide rails further apart from each other.

9. A clip fastener as claimed in claim 1 further comprising at least one storage means for storing magazines not currently in use.

10. A clip fastener as claimed in claim 1 further comprising:

a sensor switch associated with the cartridge; and a window in the cartridge through which the sensor switch can detect the presence, absence and/or low level quantity of clips in the cartridge.

11. A clip fastener as claimed in claim 1 wherein the cartridge comprises at least one securing member for securing the cartridge in the clip fastener.

12. A clip fastener as claimed in claim 1 wherein the cartridge includes biasing means for biasing a plurality of clips in the cartridge toward the lower end of the cartridge.

13. A clip fastener as claimed in claim 1 wherein the guide rails are movable between a first position so as to have a first distance between them and a second position so as to have a second larger distance between them, the guide rails in the first position being adapted to receive standard size smaller clips and the guide rails in the second position being adapted to receive standard size larger clips.

14. A clip fastener as claimed in claim 1 wherein a depressor is provided for separating inner and outer loops of the paper clips and comprises a thin, flat structure having a curved edge for engaging the inner loop.

15. A clip fastener as claimed in claim 13 further comprising biasing means for normally urging the guide rails into the first position.

16. A clip fastener as claimed in claim 1 wherein the spring member comprises a leaf spring secured bye pair of pins.

17. A clip fastener as claimed in claim 1 further comprising at least one light for indicating the size of clips in the cartridge.

18. A clip fastener as claimed in claim 1 further comprising a surface upon which papers to be clipped are mounted so as to receive the clip from the clip fastener.

19. A clip fastener as claimed in claim 18 wherein the surface is mounted on a spring so that the level of the surface is automatically adjusted according to the weight or volume of the papers mounted thereon.

20. A clip fastener as claimed in claim 1 wherein the ram member is mechanically activated.

21. A clip fastener as claimed in claim 1 wherein the ram member is electrically operated.

22. A clip fastener as claimed in claim 1 wherein the spreader means comprises a pair of wedge-shaped spreaders having a sharpened leading edge, an upper surface substantially parallel and coplanar with the track, and a lower inclined surface, each wedge for engaging a clip as it moves along the pathway for separating the inner loop of the clip from the outer loop thereof.

23. A clip fastener as claimed in claim 22 wherein the wedge has a first sloped surface for separating the inner loop of a standard size small clip from the outer loop thereof and a second sloped surface for separating the inner loop of a standard size large clip from the outer loop thereof.

24. A clip fastener as claimed in claim 22 wherein the wedges have channels therein for stabilizing a paper clip moving thereover.

25. A clip fastener as claimed in claim 1 further comprising a depressing member immediately upstream of the spreader means, the depressing member pushing down slightly a leading part of the inner loop of the clip to facilitate engagement of the spreader between the inner loop and the outer loop.

26. A clip fastener as claimed in claim 2 wherein the spreader means has a first set of grooves for receiving at least a part of the outer loop of a smaller clip and a second set of grooves for receiving at least a part of the inner loop of a larger clip.

27. A clip fastener as claimed in claim 1 wherein the Slip fastener is able to accommodate and dispense paper clips of at least two sizes.

28. A cartridge for use with a clip fastener, the cartridge comprising a housing for receiving a plurality of paper clips, regulating means on the housing for cooperating with the clip fastener, the regulating means adjusting the distance between a pair of guide rails in the housing so that the guide rails will be configured to process paper clips of the size contained in the cartridge, and a spring member for engaging the cartridge to facilitate secure attachment within the clip fastener.

29. A cartridge as claimed in claim 28 further comprising an opening in the cartridge through which a sensor can detect the presence, absence and/or low quantity of clips in the cartridge.

30. A clip fastener comprising:

a housing;

a releasable cartridge located in or on the housing for holding a plurality of clips, the releasable cartridge having regulating means thereon;

a track for receiving clips from the magazine, the track comprising a pair of guide rails;

means for varying the distance between the guide rails in response to the regulating means on the cartridge;

a ram member for moving the clip along a pathway defined by the track;

a sensor switch associated with the cartridge; and a window in the cartridge through which the sensor switch can detect the presence, absence and/or low level quantity of clips in the cartridge.

* * * * *